(12) United States Patent
Van Heugten

(10) Patent No.: US 9,329,309 B2
(45) Date of Patent: May 3, 2016

(54) ELECTROACTIVE LENS WITH MULTIPLE DEPTH DIFFRACTIVE STRUCTURES

(75) Inventor: Anthony Van Heugten, Sarasota, FL (US)

(73) Assignee: e-Vision Smart Optics, Inc., Sarasota, FL (US)

( * ) Notice: Subject to any disclaimer, the term of this patent is extended or adjusted under 35 U.S.C. 154(b) by 397 days.

(21) Appl. No.: 13/504,721

(22) PCT Filed: Apr. 18, 2012

(86) PCT No.: PCT/US2012/033995
§ 371 (c)(1),
(2), (4) Date: Jun. 29, 2012

(87) PCT Pub. No.: WO2013/130115
PCT Pub. Date: Sep. 6, 2013

(65) Prior Publication Data
US 2013/0222756 A1    Aug. 29, 2013

Related U.S. Application Data

(60) Provisional application No. 61/603,615, filed on Feb. 27, 2012.

(51) Int. Cl.
*G02B 3/08* (2006.01)
*G02C 7/04* (2006.01)
*G02B 3/14* (2006.01)
*G02B 5/18* (2006.01)

(52) U.S. Cl.
CPC ................ *G02B 3/14* (2013.01); *G02B 5/1876* (2013.01)

(58) Field of Classification Search
CPC .... G02B 5/1861; G02B 5/1876; G02B 5/188; G02B 5/1885; G02B 5/189; G02B 5/1895; G03B 21/602
See application file for complete search history.

(56) References Cited

U.S. PATENT DOCUMENTS

| 4,904,063 A | 2/1990 | Okada et al. |
| 5,030,205 A | 7/1991 | Holdaway et al. |
| 5,053,014 A | 10/1991 | Van Heugten |

(Continued)

FOREIGN PATENT DOCUMENTS

| JP | S61-124930 A | 6/1986 |
| JP | H01250902 A | 10/1989 |

(Continued)

OTHER PUBLICATIONS

International Search Report in International Application No. PCT/US2012/033995, mailed Aug. 3, 2012, 2 pages.

(Continued)

*Primary Examiner* — Ricky Mack
*Assistant Examiner* — Robert E Tallman
(74) *Attorney, Agent, or Firm* — Cooley LLP

(57) ABSTRACT

Certain exemplary embodiments can provide a system, machine, device, manufacture, circuit, composition of matter, and/or user interface adapted for and/or resulting from, and/or a method and/or machine-readable medium comprising machine-implementable instructions for, activities that can comprise and/or relate to, switch a diffractive first electroactive lens from a first power state corresponding to a first optical power to a second power state corresponding to a second optical power that differs from said first optical power.

22 Claims, 4 Drawing Sheets

(56) References Cited

U.S. PATENT DOCUMENTS

| | | |
|---|---|---|
| 5,120,319 A | 6/1992 | Van Heugten et al. |
| 5,156,792 A | 10/1992 | Holdaway et al. |
| 5,229,797 A | 7/1993 | Futhey |
| 5,312,376 A | 5/1994 | Van Heugten |
| 5,425,903 A | 6/1995 | Sloane, Jr. et al. |
| 5,713,915 A | 2/1998 | Van Heugten et al. |
| RE37,304 E | 7/2001 | Van Heugten et al. |
| 6,491,391 B1 | 12/2002 | Blum et al. |
| 6,491,394 B1 | 12/2002 | Blum et al. |
| 6,517,203 B1 | 2/2003 | Blum et al. |
| 6,551,326 B1 | 4/2003 | Van Heugten et al. |
| 6,619,799 B1 | 9/2003 | Blum et al. |
| 6,733,130 B2 | 5/2004 | Blum et al. |
| 6,736,510 B1 | 5/2004 | Van Heugten |
| 6,851,805 B2 | 2/2005 | Blum et al. |
| 6,857,741 B2 | 2/2005 | Blum et al. |
| 6,871,951 B2 | 3/2005 | Blum et al. |
| 6,918,670 B2 | 7/2005 | Blum et al. |
| 6,927,894 B2 | 8/2005 | Blum et al. |
| 6,986,579 B2 | 1/2006 | Blum et al. |
| 7,018,040 B2 | 3/2006 | Blum et al. |
| 7,019,890 B2 | 3/2006 | Meredith et al. |
| 7,023,594 B2 | 4/2006 | Blum et al. |
| 7,077,519 B2 | 7/2006 | Blum et al. |
| 7,188,948 B2 | 3/2007 | Blum et al. |
| 7,195,353 B2 | 3/2007 | Blum et al. |
| 7,234,809 B2 | 6/2007 | Blum et al. |
| 7,264,354 B2 | 9/2007 | Blum et al. |
| 7,290,875 B2 | 11/2007 | Blum et al. |
| 7,290,876 B2 | 11/2007 | Duston et al. |
| 7,374,283 B2 | 5/2008 | Blum et al. |
| 7,393,101 B2 | 7/2008 | Blum et al. |
| 7,396,126 B2 | 7/2008 | Blum et al. |
| 7,404,636 B2 | 7/2008 | Blum et al. |
| 7,425,066 B2 | 9/2008 | Blum et al. |
| 7,455,404 B2 * | 11/2008 | Bandhauer et al. ...... 351/159.44 |
| 7,475,984 B2 | 1/2009 | Blum et al. |
| 7,490,936 B2 | 2/2009 | Blum et al. |
| 7,517,083 B2 | 4/2009 | Blum et al. |
| 7,524,059 B2 | 4/2009 | Blum et al. |
| 7,533,993 B2 | 5/2009 | Blum et al. |
| 7,588,332 B2 | 9/2009 | Blum et al. |
| 7,594,729 B2 | 9/2009 | Van Heugten |
| 7,604,349 B2 | 10/2009 | Blum et al. |
| 7,619,809 B2 | 11/2009 | Blum et al. |
| 7,731,358 B2 | 6/2010 | Blum et al. |
| 7,744,214 B2 | 6/2010 | Blum et al. |
| 7,775,660 B2 | 8/2010 | Stewart |
| 7,883,505 B2 | 2/2011 | Van Heugten et al. |
| 7,988,286 B2 | 8/2011 | Blum et al. |
| 7,997,733 B2 | 8/2011 | Blum et al. |
| 8,029,134 B2 | 10/2011 | Blum et al. |
| 8,047,651 B2 | 11/2011 | Blum et al. |
| 8,128,228 B2 | 3/2012 | Van Heugten |
| 8,154,804 B2 | 4/2012 | McGinn et al. |
| 8,215,770 B2 | 7/2012 | Blum et al. |
| 8,333,470 B2 | 12/2012 | Blum et al. |
| 8,394,083 B2 | 3/2013 | Van Heugten et al. |
| 8,419,340 B2 | 4/2013 | Ogawa |
| 8,475,439 B2 | 7/2013 | Van Heugten et al. |
| 8,579,435 B2 | 11/2013 | Blum et al. |
| 8,619,405 B2 | 12/2013 | Van Heugten |
| 8,641,191 B2 | 2/2014 | Blum et al. |
| 8,727,531 B2 | 5/2014 | Blum et al. |
| 8,778,022 B2 | 7/2014 | Blum et al. |
| 2003/0007240 A1 | 1/2003 | Blum et al. |
| 2003/0151611 A1 | 8/2003 | Turpin et al. |
| 2003/0156752 A1 | 8/2003 | Turpin et al. |
| 2003/0158617 A1 | 8/2003 | Turpin et al. |
| 2003/0158788 A1 | 8/2003 | Turpin et al. |
| 2003/0174882 A1 | 9/2003 | Turpin et al. |
| 2003/0210377 A1 | 11/2003 | Blum et al. |
| 2003/0231293 A1 | 12/2003 | Blum et al. |
| 2004/0027501 A1 | 2/2004 | Blum et al. |
| 2004/0027536 A1 | 2/2004 | Blum et al. |
| 2004/0051846 A1 | 3/2004 | Blum et al. |
| 2004/0056986 A1 | 3/2004 | Blum et al. |
| 2004/0084790 A1 | 5/2004 | Blum et al. |
| 2004/0156021 A1 | 8/2004 | Blum et al. |
| 2004/0223113 A1 | 11/2004 | Blum et al. |
| 2005/0036109 A1 | 2/2005 | Blum et al. |
| 2005/0099594 A1 | 5/2005 | Blum et al. |
| 2005/0140924 A1 | 6/2005 | Blum et al. |
| 2005/0141087 A1 | 6/2005 | Yoshida |
| 2005/0168687 A1 | 8/2005 | Blum et al. |
| 2005/0185135 A1 | 8/2005 | Blum et al. |
| 2005/0206844 A1 | 9/2005 | Blum et al. |
| 2005/0213027 A1 | 9/2005 | Blum et al. |
| 2005/0219460 A1 | 10/2005 | Blum et al. |
| 2005/0237485 A1 | 10/2005 | Blum et al. |
| 2005/0241653 A1 | 11/2005 | Van Heugten et al. |
| 2005/0243276 A1 | 11/2005 | Van Heugten et al. |
| 2005/0270481 A1 | 12/2005 | Blum et al. |
| 2006/0007395 A1 | 1/2006 | Mayo et al. |
| 2006/0023004 A1 | 2/2006 | Duston et al. |
| 2006/0066808 A1 | 3/2006 | Blum et al. |
| 2006/0092340 A1 | 5/2006 | Blum et al. |
| 2006/0095128 A1 | 5/2006 | Blum et al. |
| 2006/0098164 A1 | 5/2006 | Blum et al. |
| 2006/0116635 A1 | 6/2006 | Van Heugten et al. |
| 2006/0126698 A1 | 6/2006 | Blum et al. |
| 2006/0139570 A1 | 6/2006 | Blum et al. |
| 2006/0203196 A1 | 9/2006 | Van Heugten |
| 2006/0238701 A1 | 10/2006 | Blum |
| 2007/0030573 A1 | 2/2007 | Batchko |
| 2007/0052920 A1 | 3/2007 | Stewart et al. |
| 2007/0081126 A1 | 4/2007 | Blum et al. |
| 2007/0091258 A1 | 4/2007 | Blum et al. |
| 2007/0146625 A1 | 6/2007 | Ooi et al. |
| 2007/0146627 A1 | 6/2007 | Blum et al. |
| 2007/0178353 A1 | 8/2007 | Karichev et al. |
| 2007/0216864 A1 | 9/2007 | Blum et al. |
| 2007/0258039 A1 | 11/2007 | Duston et al. |
| 2008/0024718 A1 | 1/2008 | Blum et al. |
| 2008/0086109 A1 | 4/2008 | Shabty et al. |
| 2008/0174732 A1 | 7/2008 | Blum et al. |
| 2008/0208335 A1 | 8/2008 | Blum et al. |
| 2008/0246922 A1 | 10/2008 | Blum et al. |
| 2008/0273167 A1 * | 11/2008 | Clarke .................... 351/159 |
| 2009/0015785 A1 | 1/2009 | Blum et al. |
| 2009/0033863 A1 | 2/2009 | Blum et al. |
| 2009/0033866 A1 | 2/2009 | Blum et al. |
| 2009/0046349 A1 * | 2/2009 | Haddock et al. ............. 359/319 |
| 2009/0079938 A1 | 3/2009 | Blum et al. |
| 2009/0109401 A1 | 4/2009 | Van Heugten |
| 2009/0164007 A1 | 6/2009 | Van Heugten |
| 2009/0256977 A1 | 10/2009 | Haddock |
| 2009/0264966 A1 | 10/2009 | Blum et al. |
| 2009/0279050 A1 | 11/2009 | McGinn et al. |
| 2010/0073632 A1 | 3/2010 | Blum et al. |
| 2010/0220383 A1 | 9/2010 | Wik et al. |
| 2010/0290882 A1 | 11/2010 | Ogawa |
| 2011/0001960 A1 | 1/2011 | Van Heugten |
| 2011/0037946 A1 | 2/2011 | Blum et al. |
| 2011/0235186 A1 | 9/2011 | Blum et al. |
| 2011/0267579 A1 | 11/2011 | Van Heugten et al. |
| 2011/0279772 A1 | 11/2011 | Blum |
| 2011/0292266 A1 | 12/2011 | Duston et al. |
| 2012/0008094 A1 | 1/2012 | Blum et al. |
| 2012/0038882 A1 | 2/2012 | Blum et al. |
| 2012/0062784 A1 | 3/2012 | Van Heugten et al. |
| 2012/0092775 A1 | 4/2012 | Duston et al. |
| 2012/0188512 A1 | 7/2012 | Duston et al. |
| 2012/0267030 A1 | 10/2012 | Hall et al. |
| 2013/0021574 A1 | 1/2013 | Van Heugten et al. |
| 2013/0208238 A1 | 8/2013 | Blum et al. |
| 2013/0235332 A1 | 9/2013 | Blum et al. |
| 2013/0242253 A1 | 9/2013 | Blum et al. |
| 2013/0250135 A1 | 9/2013 | Blum et al. |
| 2013/0282117 A1 | 10/2013 | Van Heugten et al. |

(56) References Cited

U.S. PATENT DOCUMENTS

2013/0335705 A1    12/2013   Van Heugten et al.
2014/0036226 A1    2/2014   Blum et al.

FOREIGN PATENT DOCUMENTS

| | | |
|---|---|---|
| JP | H03210521 A | 9/1991 |
| JP | H04322214 A | 11/1992 |
| JP | H05297209 A | 11/1993 |
| JP | 2002-083973 A | 3/2002 |
| JP | 2005-243151 A | 9/2005 |
| JP | 2006-085801 A | 3/2006 |
| JP | 2007-104107 A | 4/2007 |
| JP | 2008-275715 A | 11/2008 |
| JP | 4287896 B1 | 7/2009 |
| JP | 2010-204447 A | 9/2010 |
| TW | 200400410 A | 1/2004 |
| TW | 200745656 A | 12/2007 |
| WO | WO 01/84635 A1 | 11/2001 |
| WO | WO 2006/115147 A1 | 11/2006 |

OTHER PUBLICATIONS

Written Opinion in International Application No. PCT/US2012/033995, mailed Aug. 3, 2012, 4 pages.
International Preliminary Report on Patentability in International Application No. PCT/US2012/033995, mailed Sep. 12, 2014, 6 pages.
European Patent Office Communication and Supplementary European Search Report and Search Opinion in related European Patent Application No. 12870040.8 dated Sep. 11, 2015, 5 pages.

* cited by examiner

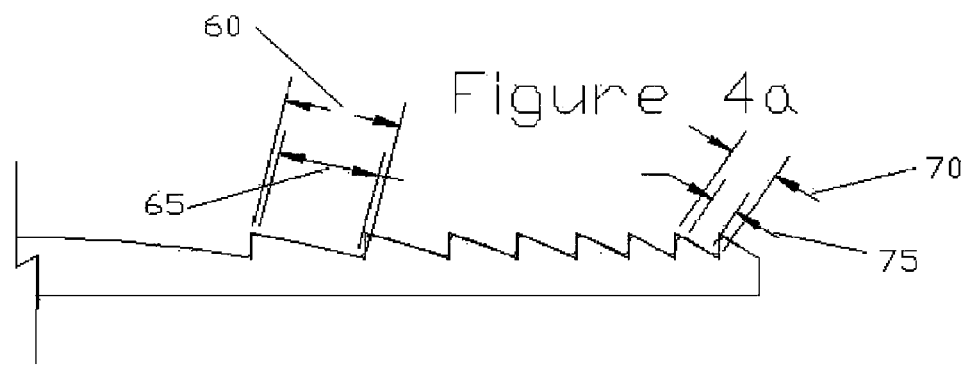
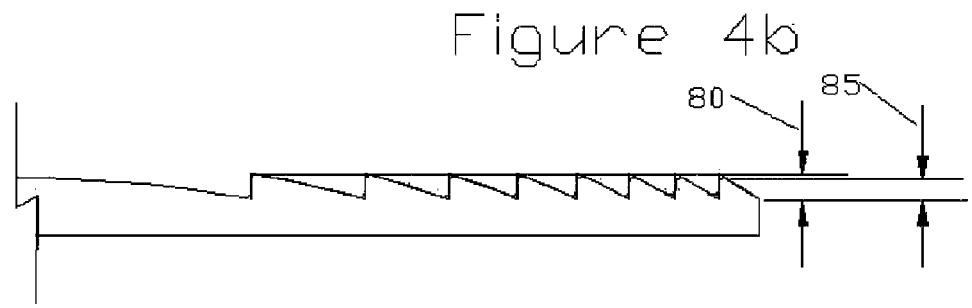
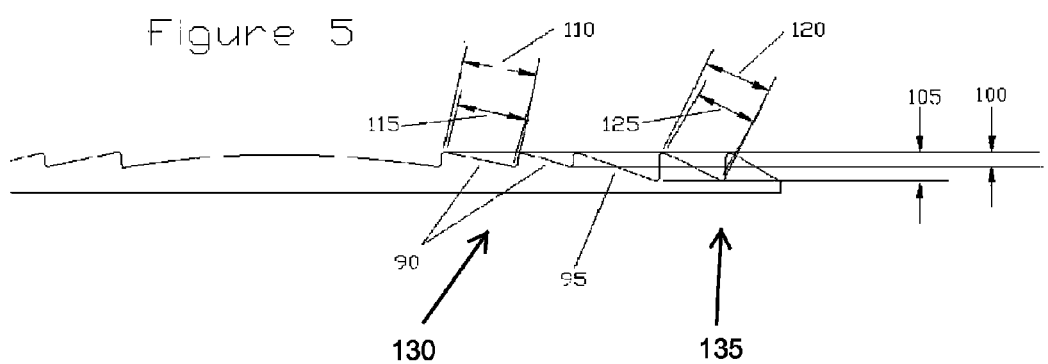

ELECTROACTIVE LENS WITH MULTIPLE DEPTH DIFFRACTIVE STRUCTURES

CROSS-REFERENCES TO RELATED APPLICATIONS

This application is a national-stage entry under 35 U.S.C. §371 of International Application No. PCT/US12/339950, filed 18 Apr. 2012, which in turn claims priority to U.S. Provisional Patent Application 61/603,615, filed 27 Feb. 2012.

BRIEF DESCRIPTION OF THE DRAWINGS

A wide variety of potential, feasible, and/or useful embodiments will be more readily understood through the herein-provided, non-limiting, non-exhaustive description of certain exemplary embodiments, with reference to the accompanying exemplary drawings in which:

FIG. 4a is a cross-sectional view of an exemplary embodiment of a Fresnel lens;

FIG. 4b is a cross-sectional view of an exemplary embodiment of a Fresnel lens;

FIG. 5 is a cross-sectional view of an exemplary embodiment of a Fresnel lens.

DESCRIPTION

Figure 1:
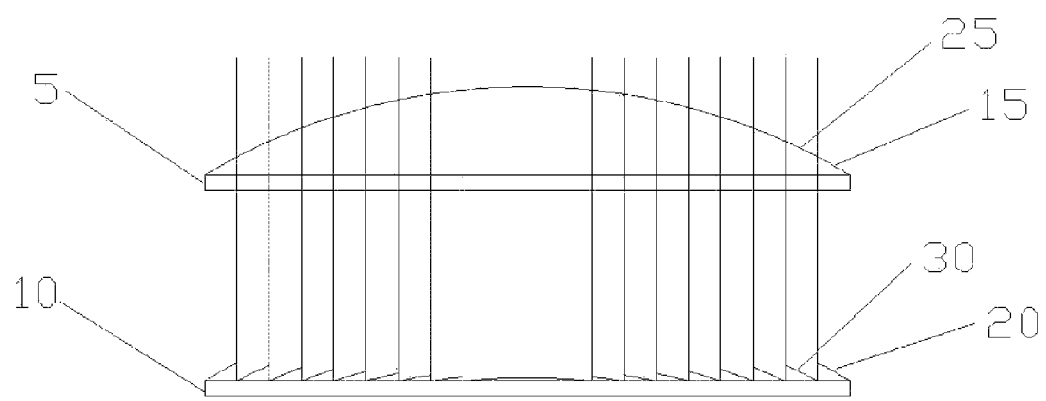
FIG. 1 is a cross-sectional view of an exemplary embodiment of a Fresnel lens.

Certain exemplary embodiments can provide an electroactive diffractive lens utilizing a Fresnel structure immersed in liquid crystal. A Fresnel lens structure can be formed in a substrate, then it can be flooded with liquid crystal that can have an index of refraction in the unpowered state that is equal to or close to the index of refraction of the substrate. A second substrate can be placed over top, sandwiching the liquid crystal between the two substrates.

While the liquid crystal is in the unpowered state, i.e., no electricity applied to it, and the index of refraction of the liquid crystal substantially equals that of the substrate, the Fresnel lens can have no optical effect upon the light that is passing through the lens. That is, the structure can behave as if it were a flat piece of glass or plastic. However, when a voltage is applied to the liquid crystal, the index of refraction of the liquid crystal can change but the substrate material need not change, and the Fresnel structure then can behave as a lens. This can allow the lens to be turned on with the application of an electric voltage, and turned off with the removal of the electric voltage. If the liquid crystal index of refraction is different from the index of refraction of the material that the Fresnel structure is made from, then the device can have optical power with no electricity applied, then a changed optical power when the electricity is applied.

An example of a lens construction of this type is as follows. A Fresnel structure can be molded into a plastic substrate. A coating of a clear electrical conductor such as indium tin oxide can be applied over the Fresnel structure, and/or it can be connected to one side of the electric circuit. An insulating layer such as silicone dioxide can be applied over the indium tin oxide, then an alignment layer can be applied over the silicone dioxide layer. The alignment layer can be polyimide, and/or it can be rubbed to align the molecules, which in turn can produce an alignment force upon the liquid crystal when the liquid crystal is in contact with the alignment layer. A second substrate can be treated the same as the first substrate, except that it need not have a Fresnel structure formed into it. Its layer of indium tin oxide can be connected to the other side of the electrical circuit. Liquid crystal can be deposited into the Fresnel structure and the two substrates can be bonded together. An AC voltage, typically a square wave, can be applied to the lens to turn it on. The AC voltage typically can be 50 to 100 Hz and/or can be 10 volts. The voltage requirements can change based upon the recipe of liquid crystal used.

When designing the Fresnel structure for use in a liquid crystal lens, certain design rules are utilized to obtain maximum optical performance and efficiency. One important design rule is to minimize the thickness of the liquid crystal. As the thickness of the liquid crystal increases, the speed of lens switching decreases, as well as an increase in electrical power requirements. However, with thin layers of liquid crystal, the optical power that can be created is limited. Additionally, when Fresnel lenses are used in the conventional way, i.e., in air, the index of refraction delta between the glass or plastic lens material and the air it is operating in can be quite large because air has an index of refraction of one. For example, if the lens material has an index of refraction of 1.67, there is a delta n (n=index of refraction) of 0.67, so significant optical powers can be created. However, with liquid crystals, the delta between the lens material and the liquid crystal typically is much smaller, typically 0.2, so it can be more challenging to obtain high optical powers from a Fresnel type of structure that is immersed in liquid crystal. What could be beneficial is a way to produce a lens with higher optical power, yet utilize as thin a layer of liquid crystal as possible to minimize power consumption and maximize switching speed. Certain exemplary embodiments can minimize the volume of liquid crystal, yet maximize the optical power produced.

FIG. 1 shows the basic concept of a Fresnel lens in cross section compared to a substantially optically equivalent convention lens. Conventional refractive lens 5 is shown above a corresponding Fresnel lens 10. Segments of the conventional lens 5 are substantially optically replicated in the Fresnel lens, identified by the vertical lines. (The vertical lines are only for identification purposes to show what part of the conventional lens is associated to its corresponding part in the Fresnel lens.) Two segments are shown. Segment 15 of the conventional lens is substantially optically duplicated in Segment 20 of the Fresnel lens 10, and segment 25 in conventional lens 5 is substantially optically duplicated in segment 30 of Fresnel lens 10. Every segment of the conventional lens 5 is substantially optically duplicated in a segment of Fresnel lens 10.

Figure 2:
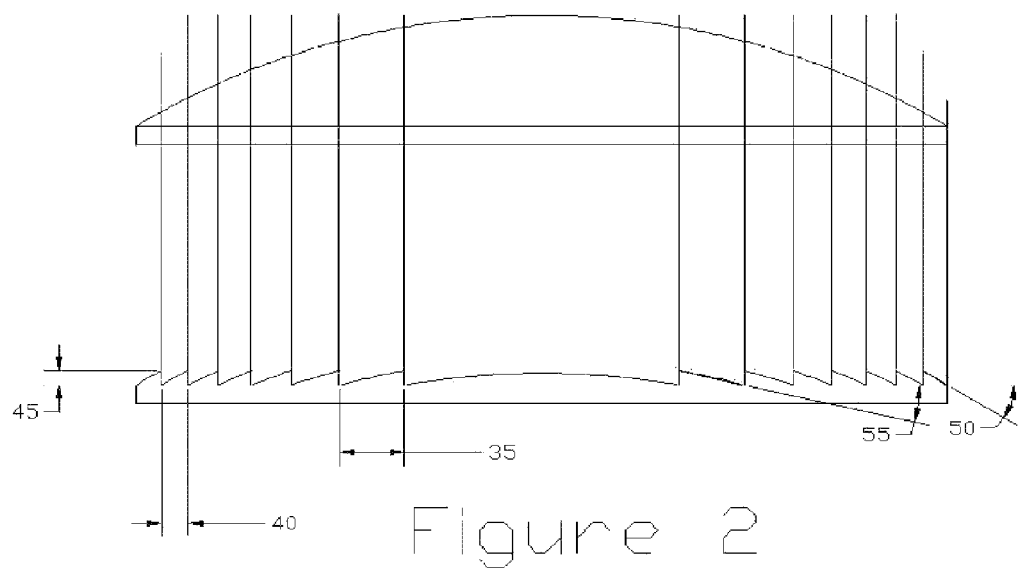
FIG. 2 is a cross-sectional view of an exemplary embodiment of a Fresnel lens.

FIG. 2 shows the basic concept of a Fresnel lens in cross section compared to a substantially optically equivalent conventional lens, but with the additional design rule added of maintaining a consistent height of the formed structure, shown as dimension 45. This design rule can maximize the optical efficiency of the lens. Utilizing this design rule, along with the design parameters disclosed herein, can categorize this type of lens as a diffractive lens. These consistent heights can be established as integer multiples of waves of light of retardation by the liquid crystal at the design wavelength. For example, if the design wavelength was 550 nanometers, and the liquid crystal has a change of index of refraction from the off state to the on state from 1.7 to 1.5, one wavelength of retardation could require a height 45 of 2.75 microns (i.e., 0.550/(1.7−1.5)=2.75). Two wavelengths could require a height 45 of 5.5 microns, etc. (see example spreadsheet in TABLE 1 below). Some variations of this may apply, for example if using a Cholesteric liquid crystal the delta between the index of refraction at the ordinary polarization of light and the average between the ordinary and extraordinary index of refractions of the liquid crystal would be used as the value to divide into the wavelength. Other variations may utilize the index of refraction of the substrate material supporting the liquid crystal as one value of the index of refraction to subtract the index of refraction of the liquid crystal from to derive the value to be divided into the design wavelength. When the liquid crystal is subjected to an electric field, the index of refraction can change to its powered state and/or the optical path length of the lens can change. When the electric field is removed, the liquid crystal can revert back to the index of refraction in its unpowered state and/or the optical path length of the lens can revert back to its length in the unpowered state. The difference between these two values of the optical path length is known as the optical path difference, or, OPD. When the lens is correctly designed using the exemplary methods provided herein, or perhaps some other mathematical method, the OPD of the lens can be a multiple of an integer multiplied by a quotient corresponding to the design wavelength of light divided into the OPD. As a lens is designed with this design rule, the width of the rings can become smaller as the rings become further away from the center. As shown in FIG. 2, ring 35 is wider than ring 40 because ring 40 is further out from center. All rings can have the same height 45. Using this design rule, there can be a limit to the amount of optical power that can be created at each particular height for a given diameter of lens, such that the ring structure can become so dense that it can no longer function efficiently. As the rings become more densely packed, the angle of slope 50 can increase, and at some point a fully formed ring structure can be no longer possible to be made that still conforms to the consistent-height design rule. The conventional solution to this problem is to use a taller height of structure, but doing this will increase power demands and slow down the lens switching speed. This will be explained in greater detail in following paragraphs.

TABLE 1

| Design Wavelength (um) | n substrate | n o liquid crystal | delta n | ideal height |
|---|---|---|---|---|
| 0.5 | 1.6775 | 1.520263582 | 0.157236 | 3.179925 |
| 0.51 | 1.6757 | 1.518702865 | 0.156997 | 3.248467 |
| 0.52 | 1.674 | 1.517232667 | 0.156767 | 3.317018 |
| 0.53 | 1.67245 | 1.5158461 | 0.156604 | 3.384335 |
| 0.54 | 1.67095 | 1.514536919 | 0.156413 | 3.452397 |
| 0.55 | 1.66955 | 1.513299454 | 0.156251 | 3.519988 |
| 0.56 | 1.66825 | 1.512128547 | 0.156121 | 3.586951 |
| 0.57 | 1.667 | 1.511019495 | 0.155981 | 3.654303 |
| 0.58 | 1.66585 | 1.509968004 | 0.155882 | 3.720763 |
| 0.59 | 1.66475 | 1.50897015 | 0.15578 | 3.787396 |
| 0.6 | 1.66375 | 1.508022335 | 0.155728 | 3.85288 |

Figure 3A:
FIG. 3a is a cross-sectional view of an exemplary embodiment of a Fresnel lens.

FIG. 3a shows in cross section an example Fresnel lens used in air.

Figure 3B:
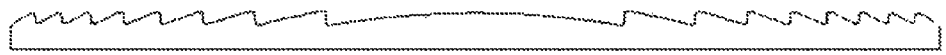
FIG. 3b is a cross-sectional view of an exemplary embodiment of a Fresnel lens.

FIG. 3b shows an example design of a Fresnel type of lens used in a liquid crystal environment. The sharp points and sharp corners of the saw tooth pattern are rounded with a radius. This can allow the liquid crystal to settle into the valleys with better orientation and less disturbances, and/or can allow phase resets to be introduced into the peaks.

Figure 3C:
FIG. 3c is a cross-sectional view of a portion of an exemplary embodiment of a Fresnel lens.

FIG. 3c shows the sharp-edge profile of FIG. 3a superimposed over the rounded corners profile of FIG. 3b to better illustrate the difference between the two. For clarity, the figure zooms into the right side of the profile only.

FIG. 4a shows a zoomed-in cross section of the two profiles shown in FIG. 3c. Dimensions 60 and 70 show the facet width of the sharp-corner rings, and dimensions 65 and 75 show the facet width of the rounded corner rings. Because the sharp corner facets do not have any rounding off applied to their edges, they are larger in length than the rounded corner rings. In the case of the rounded rings closer to the center of the lens, the ratio of the facet length to the overall length including the rounded corners is higher than that ratio on rings further outward from the center. This ratio continues to increase as the rings become further out from the center of the lens.

FIG. 4b shows the undesired result of what happens to the structure profile when the event described in FIG. 4a occurs. The overall height 80 of the starting ring is larger than the overall height 85 of a ring further outward from center. As the overall height of the ring deviates from the multiple-integer-of-a-wavelength rule (described at FIG. 2), the diffractive efficiency of the lens can degrade. Some degree of difference can be tolerated if some loss of lens optical efficiency can be sacrificed, but at some point the lens efficiency loss is not acceptable.

The conventional method of overcoming this problem of having the ratio of overall-length-of-facet-ring-including-the-rounded-corners to the facet-length-without-rounded-corners becoming unacceptably high, is to start with a thicker liquid crystal layer using a higher multiple-of-integer-of-a-wavelength-of-light. However, doing so can degrade the speed of switching and increases power consumption.

FIG. 5 shows a cross section profile of an exemplary lens that can provide for higher optical power possibilities, addressing the problems described in FIGS. 4a and 4b, yet need not burden the lens with as large of a volume of liquid crystal as what would be used in the conventional approach of beginning at the center ring with a higher multiple-of-integer-of-a-wavelength-of-light thickness of liquid crystal. At the first two rings 90, a one-wavelength-of-light-design-height can be utilized. Then, at a ring further outward from the center, the multiple-of-integer-of-a-wavelength-of-light-design-rule can be incremented to a larger integer (in this example, two wavelengths), the resulting second maximal cross-section height 105 of the second zone 135 can become twice the depth of resulting first maximal cross-section height 100 that was selected for the first zone 130. When the ratio of overall-length-of-facet-ring-including-the-rounded-corners to the facet-length-without-rounded-corners of rings 90 is compared to this same ratio of ring 95, the change in ratio is not as great as depicted in FIGS. 3 and 4. This reduction in change of ratio of length-of-facet can result in a reduction of deviation from the multiple-of-integer-of-a-wavelength-of-light-design-rule, which can reduce and/or eliminate the degradation of lens efficiency in the section of the rings further out from the center. The lens efficiency further out from the center can be preserved, yet the volume of additional liquid crystal can be considerably less than the volume of liquid crystal that would have been utilized had the design height been increased across the entire lens, which can result in less degradation of switching time and/or less increase in power consumption.

In certain exemplary embodiments, the maximum cross-section height of rings 90 can be equal to a first integer multiple of a predetermined wavelength of light divided by the result of subtracting the index of refraction of the lens substrate material and the index of refraction of the liquid crystal while it is in its electrically powered state. Similarly, the maximum radial cross-section height of rings 95 can be substantially equal to a second (and different) integer multiple of the predetermined wavelength of light divided by the result of subtracting the index of refraction of the lens substrate material and the index of refraction of the liquid crystal while it is in its electrically powered state.

Certain exemplary embodiments can find applications in lenses used for ophthalmic lenses, including but not limited to: spectacles, intra ocular lenses, and contact lenses; photography, projection systems, remote sensing, solar concentration, military and environmental imaging, biomedical diagnostic equipment, security systems, and/or computer gaming. Certain exemplary embodiments can combine any number of electro-active diffractive lenses: with each other, with one or more refractive electro-active lenses, with one or more fluidic lenses, and/or with one or more conventional refractive lenses.

Figure 6:
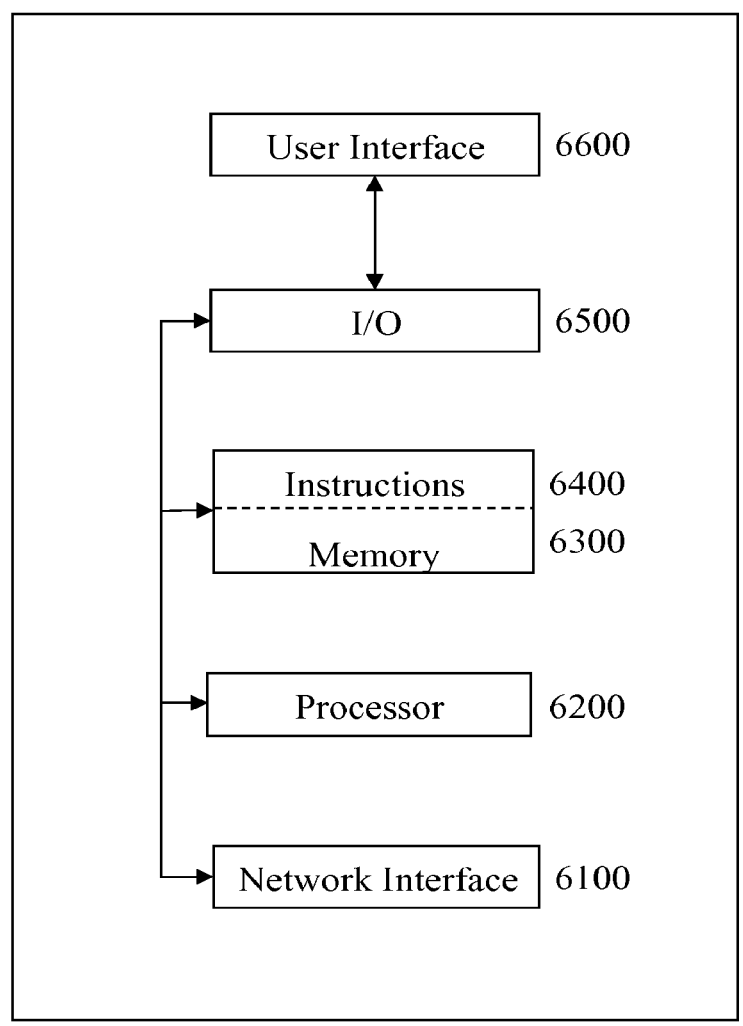
FIG. 6 is a block diagram of an exemplary embodiment of an information device.

FIG. 6 is a block diagram of an exemplary embodiment of an information device 6000, which in certain operative embodiments can comprise, for example, a controller of an electro-active lens. Information device 6000 can comprise any of numerous transform circuits, which can be formed via any of numerous communicatively-, electrically-, magnetically-, optically-, fluidically-, and/or mechanically-coupled physical components, such as for example, one or more network interfaces 6100, one or more processors 6200, one or more memories 6300 containing instructions 6400, one or more input/output (I/O) devices 6500, and/or one or more user interfaces 6600 coupled to I/O device 6500, etc.

In certain exemplary embodiments, via one or more user interfaces 6600, such as a graphical user interface, a user can view a rendering of information related to researching, designing, modeling, creating, developing, building, manufacturing, operating, maintaining, storing, marketing, selling, delivering, selecting, specifying, requesting, ordering, receiving, returning, rating, and/or recommending any of the products, services, methods, user interfaces, and/or information described herein.

Certain exemplary embodiments can provide a system, machine, device, manufacture, circuit, composition of matter, and/or user interface adapted for and/or resulting from, and/or a method and/or machine-readable medium comprising machine-implementable instructions for, activities that can comprise and/or relate to, switch a diffractive first electro-active lens from a first power state corresponding to a first optical power to a second power state corresponding to a second optical power that differs from said first optical power.

Certain exemplary embodiments can provide a system comprising:
    a diffractive first electro-active lens comprising a Fresnel structure comprising:
        a first zone defined by a first plurality of concentric rings, each ring from said first plurality of rings defined by a first maximum radial cross-section height; and/or
        a second zone defined by a second plurality of concentric rings, each ring from said second plurality of rings defined by a second maximum radial cross-section height;
        said first maximum radial cross-section height differing from said second maximum radial cross-section height;

wherein:
    said first maximum radial cross-section height is substantially equal to a first integer multiple of a predetermined wavelength of light;
    said first maximum radial cross-section height is substantially equal to a first integer multiple of a quotient corresponding to a predetermined wavelength of light divided into an optical path difference of the diffractive first electro-active lens;
    said second maximum radial cross-section height is substantially equal to a second integer multiple of said quotient;
    said first maximum radial cross-section height is substantially equal to a first integer multiple of a quotient corresponding to a predetermined wavelength of light divided into a difference of a first optical path length of the diffractive first electro-active lens that corresponds to when said lens is electrically powered and a second optical path length of said lens that corresponds to when said lens is not electrically powered;
    said second maximum radial cross-section height is substantially equal to a second integer multiple of said quotient;
    said Fresnel lens is formed in a first substrate;
    said Fresnel structure is optically coupled to a liquid crystal;
    said Fresnel lens is formed in a first substrate that is flooded with a liquid crystal;
    said Fresnel lens is formed in a first substrate that, in cooperation with a second substrate, sandwiches a liquid crystal;
    said first portion is located adjacent to said second portion;
    said first electro-active lens is an ophthalmic lens;
    said system is a camera;
    said system is a projector;
    said system is a solar concentrator;
    said system comprises a second electro-active lens;
    said system comprises a refractive electro-active lens;
    said system comprises a fluidic lens;
    said system comprises a conventional refractive lens;
    at least one of said first plurality of concentric rings has a rounded outer corner; and/or
    at least one of said first plurality of concentric rings has a rounded inner corner.

DEFINITIONS

When the following phrases are used substantively herein, the accompanying definitions apply. These phrases and definitions are presented without prejudice, and, consistent with the application, the right to redefine these phrases via amendment during the prosecution of this application or any application claiming priority hereto is reserved. For the purpose of interpreting a claim of any patent that claims priority hereto, each definition in that patent functions as a clear and unambiguous disavowal of the subject matter outside of that definition.

a—at least one.
    aberration—one or more limitations and/or defects in an optical component, such as a lens and/or mirror, that is contacted by a plurality of light rays, such limitations and/or defects preventing the light rays from converging at one focus and potentially due to, e.g., the optical component comprising one or more surfaces that are not perfectly planar, such as one or more spherical surfaces.

across—from one side to another.

activity—an action, act, step, and/or process or portion thereof.

adapted to—suitable, fit, and/or capable of performing a specified function.

adapter—a device used to effect operative compatibility between different parts of one or more pieces of an apparatus or system.

adjacent—in close proximity to, near, next to, and/or adjoining.

align—to adjust substantially into a proper orientation and/or location with respect to another thing.

and/or—either in conjunction with or in alternative to.

apparatus—an appliance or device for a particular purpose associate—to join, connect together, and/or relate.

at—in, on, and/or near.

at least—not less than, and possibly more than.

automatic—performed via an information device in a manner essentially independent of influence and/or control by a user. For example, an automatic light switch can turn on upon "seeing" a person in its "view", without the person manually operating the light switch.

beam of light—a projection of light radiating from a source.

Boolean logic—a complete system for logical operations.

border—to be located and/or positioned adjacent to an outer edge, surface, and/or extent of an object.

bound—(n) a boundary, limit, and/or further extent of; (v) to limit an extent.

bus—an electrical conductor that makes a common connection between a plurality of circuits.

by—via and/or with the use and/or help of camera—a device often comprising a lightproof enclosure having an aperture with a lens through which a still and/or moving image of an object is focused and recorded on a photosensitive film, plate, tape, and/or or sensor coupled to an electronic and/or optical memory device (e.g., RAM, EEPROM, flash memory, magnetic disk, optical disk, etc.)

can—is capable of, in at least some embodiments.

cause—to bring about, provoke, precipitate, produce, elicit, be the reason for, result in, and/or effect.

change—(v.) to cause to be different; (n.) the act, process, and/or result of altering or modifying.

circuit—a physical system comprising, depending on context: an electrically conductive pathway, an information transmission mechanism, and/or a communications connection, the pathway, mechanism, and/or connection established via a switching device (such as a switch, relay, transistor, and/or logic gate, etc.); and/or an electrically conductive pathway, an information transmission mechanism, and/or a communications connection, the pathway, mechanism, and/or connection established across two or more switching devices comprised by a network and between corresponding end systems connected to, but not comprised by the network.

co-operate—to work, act, and/or function together and/or in harmony, as opposed to separately and/or in competition.

comprises—includes, but is not limited to, what follows.

comprising—including but not limited to.

concentric—having a common central axis.

conductor—an electrically conductive material and/or component adapted to apply a voltage to an electroactive material.

configure—to make suitable or fit for a specific use or situation.

connect—to join or fasten together.

contact—to physically touch and/or come together.

containing—including but not limited to.

contiguous—neighboring and/or adjacent.

controller—a device and/or set of machine-readable instructions for performing one or more predetermined and/or user-defined tasks. A controller can comprise any one or a combination of hardware, firmware, and/or software. A controller can utilize mechanical, pneumatic, hydraulic, electrical, magnetic, optical, informational, chemical, and/or biological principles, signals, and/or inputs to perform the task(s). In certain embodiments, a controller can act upon information by manipulating, analyzing, modifying, converting, transmitting the information for use by an executable procedure and/or an information device, and/or routing the information to an output device. A controller can be a central processing unit, a local controller, a remote controller, parallel controllers, and/or distributed controllers, etc. The controller can be a general-purpose microcontroller, such the Pentium IV series of microprocessor manufactured by the Intel Corporation of Santa Clara, Calif., and/or the HC08 series from Motorola of Schaumburg, Ill. In another embodiment, the controller can be an Application Specific Integrated Circuit (ASIC) or a Field Programmable Gate Array (FPGA) that has been designed to implement in its hardware and/or firmware at least a part of an embodiment disclosed herein.

conventional—based on or in accordance with general agreement, use, and/or practice; customary; conforming to established practice and/or accepted standards; and/or traditional.

convert—to transform, adapt, and/or change.

corner—The position at which two lines, surfaces, or edges meet and form an angle corresponding—related, associated, accompanying, similar in purpose and/or position, conforming in every respect, and/or equivalent and/or agreeing in amount, quantity, magnitude, quality, and/or degree.

couple—to join, connect, and/or link by any known approach, including mechanical, fluidic, acoustic, electrical, magnetic, and/or optical, etc. approaches.

coupleable—capable of being joined, connected, and/or linked together.

coupling—linking in some fashion.

create—to bring into being.

cross-section—a section formed by a plane cutting through an object at a right angle to an axis.

data—distinct pieces of information, usually formatted in a special or predetermined way and/or organized to express concepts, and/or represented in a form suitable for processing by an information device.

data structure—an organization of a collection of data that allows the data to be manipulated effectively and/or a logical relationship among data elements that is designed to support specific data manipulation functions. A data structure can comprise meta data to describe the properties of the data structure. Examples of data structures can include: array, dictionary, graph, hash, heap, linked list, matrix, object, queue, ring, stack, tree, and/or vector.

define—to establish the outline, form, and/or structure of.

deposit—to put, lay, place, position, and/or set down; and/or to fasten, fix, and/or secure.

determine—to find out, obtain, calculate, decide, deduce, ascertain, and/or come to a decision, typically by investigation, reasoning, and/or calculation.

device—a machine, manufacture, and/or collection thereof.

differ—to be unlike, dissimilar, and/or distinct in nature and/or quality.

diffraction—the bending of a light ray in passing an edge formed by contiguous opaque and transparent edges.

digital—non-analog and/or discrete.

diverge—to go or extend in different directions from a common point.

each—every one of a group considered individually.

electric—powered by electricity.

electrically—of relating to, producing, or operated by electricity.

electrically coupled—connected in a manner adapted to allow a flow of electricity therebetween.

electro-active—a branch of technology concerning the interaction between various properties and electrical and/or electronic states of materials and/or involving components, devices, systems, and/or processes that operate by modifying the certain properties of a material by applying to it an electrical and/or magnetic field. Sub-branches of this technology include, but are not limited to, electro-optics.

electro-active element—a component that utilizes an electro-active effect, such as an electro-active filter, reflector, lens, shutter, liquid crystal retarder, active (i.e., non-passive) polarity filter, electro-active element that is movable via an electro-active actuator, and/or conventional lens movable by an electro-active actuator.

electro-optic—a branch of technology concerning the interaction between the electromagnetic (optical) and the electrical (electronic) states of materials and/or involving components, devices, systems, and/or processes that operate by modifying the optical properties of a material by applying to it an electrical field.

electrode—an electrically conducting element that emits and/or collects electrons and/or ions and/or controls their movement by means of an electric field applied to it.

emanate—to emit, radiate, and/or shine equal—substantially the same as.

estimate—(n) a calculated value approximating an actual value; (v) to calculate and/or determine approximately and/or tentatively.

etch—to wear away the surface of material (such as a metal, glass, etc.) by chemical action, such as the action of an acid.

field—a region of space characterized by a physical property, such as gravitational or electromagnetic force or fluid pressure, having a determinable value at every point in the region.

first—an initial cited element of a set.

flat—having a substantially planar major face and/or having a relatively broad surface in relation to thickness or depth.

flood—to submerge, fill, and/or overflow.

fluid—a gas and/or liquid.

form—to produce, make, create, generate, construct, and/or shape.

Fresnel lens—a thin optical lens comprising concentric rings of segmental lenses.

from—used to indicate a source.

generate—to create, produce, give rise to, and/or bring into existence.

gradient—a rate of change with respect to distance of a variable quantity.

grid—a network of lines, real or conceptual, that cross each other to form a series of regular shapes.

haptic—involving the human sense of kinesthetic movement and/or the human sense of touch. Among the many potential haptic experiences are numerous sensations, body-positional differences in sensations, and time-based changes in sensations that are perceived at least partially in non-visual, non-audible, and non-olfactory manners, including the experiences of tactile touch (being touched), active touch, grasping, pressure, friction, traction, slip, stretch, force, torque, impact, puncture, vibration, motion, acceleration, jerk, pulse, orientation, limb position, gravity, texture, gap, recess, viscosity, pain, itch, moisture, temperature, thermal conductivity, and thermal capacity.

having—including but not limited to.

height—a measurement of the extent of something along a dimension.

human-machine interface—hardware and/or software adapted to render information to a user and/or receive information from the user; and/or a user interface.

illuminate—to provide and/or brighten with light.

impinge—to collide and/or strike.

including—including but not limited to.

index of refraction—a measure of the extent to which a substance slows down light waves passing through it. The index of refraction of a substance is equal to the ratio of the velocity of light in a vacuum to its speed in that substance. Its value determines the extent to which light is refracted when entering or leaving the substance.

indium tin oxide—a solid solution of indium(III) oxide ($In_2O_3$) and tin(IV) oxide ($SnO_2$), typically 90% $In_2O_3$, 10% $SnO_2$ by weight, that is typically transparent and colorless in thin layers and can serve as a metal-like mirror in the infrared region of the electro-magnetic spectrum. It is a widely used transparent conducting oxide due to its electrical conductivity and optical transparency Thin films of indium tin oxide are most commonly deposited on surfaces by electron beam evaporation, physical vapor deposition, and/or a range of sputter deposition techniques.

individually—of or relating to a distinct entity.

information device—any device capable of processing data and/or information, such as any general purpose and/or special purpose computer, such as a personal computer, workstation, server, minicomputer, mainframe, supercomputer, computer terminal, laptop, wearable computer, and/or Personal Digital Assistant (PDA), mobile terminal, Bluetooth device, communicator, "smart" phone (such as an iPhone-like and/or Treo-like device), messaging service (e.g., Blackberry) receiver, pager, facsimile, cellular telephone, a traditional telephone, telephonic device, a programmed microprocessor or microcontroller and/or peripheral integrated circuit elements, an ASIC or other integrated circuit, a hardware electronic logic circuit such as a discrete element circuit, and/or a programmable logic device such as a PLD, PLA, FPGA, or PAL, or the like, etc. In general any device on which resides a finite state machine capable of implementing at least a portion of a method, structure, and/or or graphical user interface described herein may be used as an information device. An information device can comprise components such as one or more network interfaces, one or more processors, one or more memories containing instructions, and/or one or more input/output (I/O) devices, one or more user interfaces coupled to an I/O device, etc.

initialize—to prepare something for use and/or some future event.

inner—closer than another to the center and/or middle.

input/output (I/O) device—any device adapted to provide input to, and/or receive output from, an information device. Examples can include an audio, visual, haptic, olfactory, and/or taste-oriented device, including, for example, a monitor, display, projector, overhead display, keyboard, keypad, mouse, trackball, joystick, gamepad, wheel, touchpad, touch panel, pointing device, microphone, speaker, video camera, camera, scanner, printer, switch, relay, haptic device, vibrator, tactile simulator, and/or tactile pad, potentially including a port to which an I/O device can be attached or connected.

install—to connect or set in position and prepare for use.

instructions—directions, which can be implemented as hardware, firmware, and/or software, the directions adapted to perform a particular operation and/or function via creation and/or maintenance of a predetermined physical circuit.

insulating—having a substantial resistance to the flow of electrical current.

integer—A member of the set of positive whole numbers {1, 2, 3, . . . }, negative whole numbers {−1, −2, −3, . . . }, and zero {0}.

layer—a continuous and relatively thin material, region, stratum, course, lamina, coating, and/or sheet having one or more functions. Need not have a constant thickness.

lens—a piece of transparent substance, often glass and/or plastic, having two opposite surfaces either both curved or one curved and one plane, used in an optical device for changing the convergence and/or focal point of light rays; and/or an optical device that transmits light and is adapted to cause the light to refract, concentrate, and/or diverge. A lens can be an ophthalmic lens, such as a spectacle lens, an intra ocular lens, and/or a contact lens.

light—electromagnetic radiation having a wavelength within a range of approximately 300 nanometers to approximately 1000 nanometers, including any and all values and subranges therebetween, such as from approximately 400 to approximately 700 nm, from the near infrared through the long wavelength, far infrared, and/or from the ultraviolet to X-rays and/or gamma rays.

light source—a device adapted to emit light responsive to an applied electrical current.

liquid—a body of matter that exhibits a characteristic readiness to flow, little or no tendency to disperse, and relatively high incompressibility, including pumpable and/or flowable slurries and/or suspensions.

liquid crystal—any of various liquids in which the atoms or molecules are regularly arrayed in either one dimension or two dimensions, the order giving rise to optical properties, such as anisotropic scattering, associated with the crystals.

locate—to place, set, find, and/or situate in a particular spot, region, and/or position.

logic gate—a physical device adapted to perform a logical operation on one or more logic inputs and to produce a single logic output, which is manifested physically. Because the output is also a logic-level value, an output of one logic gate can connect to the input of one or more other logic gates, and via such combinations, complex operations can be performed. The logic normally performed is Boolean logic and is most commonly found in digital circuits. The most common implementations of logic gates are based on electronics using resistors, transistors, and/or diodes, and such implementations often appear in large arrays in the form of integrated circuits (a.k.a., IC's, microcircuits, microchips, silicon chips, and/or chips). It is possible, however, to create logic gates that operate based on vacuum tubes, electromagnetics (e.g., relays), mechanics (e.g., gears), fluidics, optics, chemical reactions, and/or DNA, including on a molecular scale. Each electronically-implemented logic gate typically has two inputs and one output, each having a logic level or state typically physically represented by a voltage. At any given moment, every terminal is in one of the two binary logic states ("false" (a.k.a., "low" or "0") or "true" (a.k.a., "high" or "1"), represented by different voltage levels, yet the logic state of a terminal can, and generally does, change often, as the circuit processes data. Thus, each electronic logic gate typically requires power so that it can source and/or sink currents to achieve the correct output voltage. Typically, machine-implementable instructions are ultimately encoded into binary values of "0"s and/or "1"s and, are typically written into and/or onto a memory device, such as a "register", which records the binary value as a change in a physical property of the memory device, such as a change in voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc. An exemplary register might store a value of "01101100", which encodes a total of 8 "bits" (one byte), where each value of either "0" or "1" is called a "bit" (and 8 bits are collectively called a "byte"). Note that because a binary bit can only have one of two different values (either "0" or "1"), any physical medium capable of switching between two saturated states can be used to represent a bit. Therefore, any physical system capable of representing binary bits is able to represent numerical quantities, and potentially can manipulate those numbers via particular encoded machine-implementable instructions. This is one of the basic concepts underlying digital computing. At the register and/or gate level, a computer does not treat these "0"s and "1"s as numbers per se, but typically as voltage levels (in the case of an electronically-implemented computer), for example, a high voltage of approximately +3 volts might represent a "1" or "logical true" and a low voltage of approximately 0 volts might represent a "0" or "logical false" (or vice versa, depending on how the circuitry is designed). These high and low voltages (or other physical properties, depending on the nature of the implementation) are typically fed into a series of logic gates, which in turn, through the correct logic design, produce the physical and logical results specified by the particular encoded machine-implementable instructions. For example, if the encoding request a calculation, the logic gates might add the first two bits of the encoding together, produce a result "1" ("0"+"1"="1"), and then write this result into another register for subsequent retrieval and reading. Or, if the encoding is a request for some kind of service, the logic gates might in turn access or write into some other registers which would in turn trigger other logic gates to initiate the requested service.

logical—a conceptual representation.

machine-implementable instructions—directions adapted to cause a machine, such as an information device, to perform one or more particular activities, operations, and/or functions via forming a particular physical circuit. The directions, which can sometimes form an entity called a "processor", "kernel", "operating system", "program", "application", "utility", "subroutine", "script", "macro", "file", "project", "module", "library", "class", and/or "object", etc., can be embodied and/or encoded as machine code, source code, object code, compiled code, assembled code, interpretable code, and/or executable code, etc., in hardware, firmware, and/or software.

machine-readable medium—a physical structure from which a machine, such as an information device, computer, microprocessor, and/or controller, etc., can store and/or obtain one or more machine-implementable instructions, data, and/or information. Examples include a memory device, punch card, player-plano scroll, etc.

match—to mirror, resemble, harmonize, fit, correspond, and/or determine a correspondence between, two or more values, entities, and/or groups of entities.

material—a substance and/or composition.

maximum—a greatest extent.

may—is allowed and/or permitted to, in at least some embodiments.

memory device—an apparatus capable of storing, sometimes permanently, machine-implementable instructions, data, and/or information, in analog and/or digital format. Examples include at least one non-volatile memory, volatile memory, register, relay, switch, Random Access Memory, RAM, Read Only Memory, ROM, flash memory, magnetic media, hard disk, floppy disk, magnetic tape, optical media, optical disk, compact disk, CD, digital versatile disk, DVD, and/or raid array, etc. The memory device can be coupled to a processor and/or can store and provide instructions adapted to be executed by processor, such as according to an embodiment disclosed herein.

method—one or more acts that are performed upon subject matter to be transformed to a different state or thing and/or are tied to a particular apparatus, said one or more acts not a fundamental principal and not pre-empting all uses of a fundamental principal.

multiple—more than one.

network—a communicatively coupled plurality of nodes, communication devices, and/or information devices. Via a network, such nodes and/or devices can be linked, such as via various wireline and/or wireless media, such as cables, telephone lines, power lines, optical fibers, radio waves, and/or light beams, etc., to share resources (such as printers and/or memory devices), exchange files, and/or allow electronic communications therebetween. A network can be and/or can utilize any of a wide variety of sub-networks and/or protocols, such as a circuit switched, public-switched, packet switched, connection-less, wireless, virtual, radio, data, telephone, twisted pair, POTS, non-POTS, DSL, cellular, telecommunications, video distribution, cable, radio, terrestrial, microwave, broadcast, satellite, broadband, corporate, global, national, regional, wide area, backbone, packet-switched TCP/IP, IEEE 802.03, Ethernet, Fast Ethernet, Token Ring, local area, wide area, IP, public Internet, intranet, private, ATM, Ultra Wide Band (UWB), Wi-Fi, BlueTooth, Airport, IEEE 802.11, IEEE 802.11a, IEEE 802.11b, IEEE 802.11g, X-10, electrical power, 3G, 4G, multi-domain, and/or multi-zone sub-network and/or protocol, one or more Internet service providers, one or more network interfaces, and/or one or more information devices, such as a switch, router, and/or gateway not directly connected to a local area network, etc., and/or any equivalents thereof.

network interface—any physical and/or logical device, system, and/or process capable of coupling an information device to a network. Exemplary network interfaces comprise a telephone, cellular phone, cellular modem, telephone data modem, fax modem, wireless transceiver, communications port, ethernet card, cable modem, digital subscriber line interface, bridge, hub, router, or other similar device, software to manage such a device, and/or software to provide a function of such a device.

non-overlapping—not extending over or covering a part of.

offset—in a location near to but distinguishable from a given point or area.

ophthalmic—of and/or relating to the eye.

opposing—opposite; against; being the other of two complementary or mutually exclusive things; placed or located opposite, in contrast, in counterbalance, and/or across from something else and/or from each other.

optical—of or relating to light, sight, and/or a visual representation.

outer—farther than another from the center and/or middle.

overlap—to extend over and cover a part of.

packet—a generic term for a bundle of data organized in a specific way for transmission, such as within and/or across a network, such as a digital packet-switching network, and comprising the data to be transmitted and certain control information, such as a destination address.

perceptible—capable of being perceived by the human senses.

perpendicular—intersecting at or forming substantially right angles; and/or substantially at a right angle with respect to an axis.

phase—a relationship in time between successive states and/or cycles of an oscillating and/or repeating system (such as an alternating electric current, one or more light waves, and/or a sound wave) and: a fixed reference point; the states of another system; and/or the cycles of another system.

photolithography—a process whereby metallic foils, fluidic circuits, and/or printed circuits can be created by exposing a photosensitive substrate to a pattern, such as a predesigned structural pattern and/or a circuit pattern, and chemically etching away either the exposed or unexposed portion of the substrate.

photon—a particle representing a quantum of light and/or other electromagnetic radiation, the particle having zero rest mass and carrying energy proportional to the frequency of the radiation.

physical—tangible, real, and/or actual.

physically—existing, happening, occurring, acting, and/or operating in a manner that is tangible, real, and/or actual.

plurality—the state of being plural and/or more than one.

point—(n.) a defined physical and/or logical location in at least a two-dimensional system and/or an element in a geometrically described set and/or a measurement or representation of a measurement having a time coordinate and a non-time coordinate. (v.) to indicate a position and/or direction of.

portion—a part, component, section, percentage, ratio, and/or quantity that is less than a larger whole. Can be visually, physically, and/or virtually distinguishable and/or non-distinguishable.

position—to put in place or position.

power—a measure of an ability of a vision system, eye, lens, and/or lens-assisted eye, to refract, magnify, separate, converge, and/or diverge; and/or a general term that may refer to any power such as effective, equivalent, dioptric, focal, refractive, surface, and/or vergence power.

pre-—a prefix that precedes an activity that has occurred beforehand and/or in advance.

predetermined—established in advance.

probability—a quantitative representation of a likelihood of an occurrence.

processor—a machine that utilizes hardware, firmware, and/or software and is physically adaptable to perform, via Boolean logic operating on a plurality of logic gates that form particular physical circuits, a specific task defined by a set of machine-implementable instructions. A processor can utilize mechanical, pneumatic, hydraulic, electrical, magnetic, optical, informational, chemical, and/or biological principles, mechanisms, adaptations, signals, inputs, and/or outputs to perform the task(s). In certain embodiments, a processor can act upon information by manipulating, analyzing, modifying, and/or converting it, transmitting the information for use by machine-implementable instructions and/or an information device, and/or routing the information to an output device. A processor can function as a central processing unit, local controller, remote controller, parallel controller, and/or distributed controller, etc. Unless stated otherwise, the processor can be a general-purpose device, such as a microcontroller and/or a microprocessor, such the Pentium family of microprocessor manufactured by the Intel Corporation of Santa Clara, Calif. In certain embodiments, the processor can be dedicated purpose device, such as an Application Specific Integrated Circuit (ASIC) or a Field Programmable Gate Array (FPGA) that has been designed to implement in its hardware and/or firmware at least a part of an embodiment disclosed herein. A processor can reside on and use the capabilities of a controller.

programmatically—of, relating to, or having a program and/or instructions.

project—to calculate, estimate, or predict.

projector—a device for projecting a beam of light and/or for projecting an image onto a screen and/or other surface.

provide—to furnish, supply, give, and/or make available.

radial—pertaining to that which radiates from and/or converges to a common center and/or has or is characterized by parts so arranged or so radiating.

receive—to get as a signal, take, acquire, and/or obtain.

recommend—to suggest, praise, commend, and/or endorse.

reduce—to make and/or become lesser and/or smaller.

refractive—the turning and/or bending of any wave, such as a light or sound wave, when it passes from one medium into another of different optical density.

render—to, e.g., physically, chemically, biologically, electronically, electrically, magnetically, optically, acoustically, fluidically, and/or mechanically, etc., transform information into a form perceptible to a human as, for example, data, commands, text, graphics, audio, video, animation, and/or hyperlinks, etc., such as via a visual, audio, and/or haptic, etc., means and/or depiction, such as via a display, monitor, electric paper, ocular implant, cochlear implant, speaker, vibrator, shaker, force-feedback device, stylus, joystick, steering wheel, glove, blower, heater, cooler, pin array, tactile touchscreen, etc.

repeatedly—again and again; repetitively.

request—to express a desire for and/or ask for.

ring—a substantially toroidal object that can be imagined as having been generated by rotating a closed loop (e.g., ellipse, circle, irregular curve, polygon, etc.) about a fixed line external to the loop.

rounded—having a surface that is curved, arced, and/or not flat.

sandwich—to place between two things that are dissimilar to that which is placed.

scene—a place where action occurs and/or where an object of interest is present; something seen by a viewer; and/or a view and/or prospect.

second—a cited element of a set that follows an initial element.

select—to make a choice or selection from alternatives.

separated—not touching and/or spaced apart by something.

server—an information device and/or a process running thereon, that is adapted to be communicatively coupled to a network and that is adapted to provide at least one service for at least one client, i.e., for at least one other information device communicatively coupled to the network and/or for at least one process running on another information device communicatively coupled to the network. One example is a file server, which has a local drive and services requests from remote clients to read, write, and/or manage files on that drive. Another example is an e-mail server, which provides at least one program that accepts, temporarily stores, relays, and/or delivers e-mail messages. Still another example is a database server, which processes database queries. Yet another example is a device server, which provides networked and/or programmable: access to, and/or monitoring, management, and/or control of, shared physical resources and/or devices, such as information devices, printers, modems, scanners, projectors, displays, lights, cameras, security equipment, proximity readers, card readers, kiosks, POS/retail equipment, phone systems, residential equipment, HVAC equipment, medical equipment, laboratory equipment, industrial equipment, machine tools, pumps, fans, motor drives, scales, programmable logic controllers, sensors, data collectors, actuators, alarms, annunciators, and/or input/output devices, etc.

set—a related plurality.

signal—(v) to communicate; (n) one or more automatically detectable variations in a physical variable, such as a pneumatic, hydraulic, acoustic, fluidic, mechanical, electrical, magnetic, optical, chemical, and/or biological variable, such as power, energy, pressure, flowrate, viscosity, density, torque, impact, force, frequency, phase, voltage, current, resistance, magnetomotive force, magnetic field intensity, magnetic field flux, magnetic flux density, reluctance, permeability, index of refraction, optical wavelength, polarization, reflectance, transmittance, phase shift, concentration, and/or temperature, etc., that can encode information, such as machine-implementable instructions for activities and/or one or more letters, words, characters, symbols, signal flags, visual displays, and/or special sounds, etc., having prearranged meaning Depending on the context, a signal and/or the information encoded therein can be synchronous, asynchronous, hard real-time, soft real-time, non-real time, continuously generated, continuously varying, analog, discretely generated, discretely varying, quantized, digital, broadcast, multicast, unicast, transmitted, conveyed, received, continuously measured, discretely measured, processed, encoded, encrypted, multiplexed, modulated, spread, de-spread, demodulated, detected, de-multiplexed, decrypted, and/or decoded, etc.

solar concentrator—a device that magnifies the sun's intensity and directs it at a solar panel's solar cell.

solid angle—a three-dimensional angle, formed by three or more planes intersecting at a common point. Its magnitude is measured in steradians, a unitless measure. The corner of a room forms a solid angle, as does the apex of a cone; one can imagine an indefinite number of planes forming the smooth round surface of the cone all intersecting at the apex. Solid angles are commonly used in photometry.

special purpose computer—a computer and/or information device comprising a processor device having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

special purpose processor—a processor device, having a plurality of logic gates, whereby at least a portion of those logic gates, via implementation of specific machine-implementable instructions by the processor, experience a change in at least one physical and measurable property, such as a voltage, current, charge, phase, pressure, weight, height, tension, level, gap, position, velocity, momentum, force, temperature, polarity, magnetic field, magnetic force, magnetic orientation, reflectivity, molecular linkage, molecular weight, etc., thereby directly tying the specific machine-implementable instructions to the logic gate's specific configuration and property(ies). In the context of an electronic computer, each such change in the logic gates creates a specific electrical circuit, thereby directly tying the specific machine-implementable instructions to that specific electrical circuit.

spherical—of, relating to, and/or having a shape approximating that of a sphere.

state—a qualitative and/or quantitative description of condition.

store—to place, hold, and/or retain data, typically in a memory.

structure—something made up of a number of parts that are held and/or put together in a particular way.

substantially—to a great extent and/or degree.

substrate—an underlying and/or structurally supporting material, region, base, stratum, course, lamina, coating, and/or sheet.

sufficiently—to a degree necessary to achieve a predetermined result.

support—to bear the weight of, especially from below.

surface—the outer boundary of an object and/or a material layer constituting and/or resembling such a boundary.

switch—(n.) a mechanical, electrical, and/or electronic device that opens and/or closes circuits, completes and/or breaks an electrical path, and/or selects paths and/or circuits; (v.) to: form, open, and/or close one or more circuits; form, complete, and/or break an electrical and/or informational path; alternate between electrically energizing and de-energizing; select a path and/or circuit from a plurality of available paths and/or circuits; and/or establish a connection between disparate transmission path segments in a network (or between networks); (n) a physical device, such as a mechanical, electrical, and/or electronic device, that is adapted to switch.

switch—(v) to: form, open, and/or close one or more circuits; form, complete, and/or break an electrical and/or informational path; select a path and/or circuit from a plurality of available paths and/or circuits; and/or establish a connection between disparate transmission path segments in a network (or between networks); (n) a physical device, such as a mechanical, electrical, and/or electronic device, that is adapted to switch.

switch—to turn on and/or off.

system—a collection of mechanisms, devices, machines, articles of manufacture, processes, data, and/or instructions, the collection designed to perform one or more specific functions.

to—a preposition adapted for use for expressing purpose.

transform—to change in measurable: form, appearance, nature, and/or character.

transmit—to send as a signal, provide, furnish, and/or supply.

transparent—clear; characterized by conveying incident light without reflecting or absorbing a substantial portion of that light; and/or having the property of transmitting rays of light through its substance so that bodies situated beyond or behind can be distinctly seen.

unique—separate and distinct.

user interface—any device for rendering information to a user and/or requesting information from the user. A user interface includes at least one of textual, graphical, audio, video, animation, and/or haptic elements. A textual element can be provided, for example, by a printer, monitor, display, projector, etc. A graphical element can be provided, for example, via a monitor, display, projector, and/or visual indication device, such as a light, flag, beacon, etc. An audio element can be provided, for example, via a speaker, microphone, and/or other sound generating and/or receiving device. A video element or animation element can be provided, for example, via a monitor, display, projector, and/or other visual device. A haptic element can be provided, for example, via a very low frequency speaker, vibrator, tactile stimulator, tactile pad, simulator, keyboard, keypad, mouse, trackball, joystick, gamepad, wheel, touchpad, touch panel, pointing device, and/or other haptic device, etc. A user interface can include one or more textual elements such as, for example, one or more letters, number, symbols, etc. A user interface can include one or more graphical elements such as, for example, an image, photograph, drawing, icon, window, title bar, panel, sheet, tab, drawer, matrix, table, form, calendar, outline view, frame, dialog box, static text, text box, list, pick list, pop-up list, pull-down list, menu, tool bar, dock, check box, radio button, hyperlink, browser, button, control, palette, preview panel, color wheel, dial, slider, scroll bar, cursor, status bar, stepper, and/or progress indicator, etc. A textual and/or graphical element can be used for selecting, programming, adjusting, changing, specifying, etc. an appearance, background color, background style, border style, border thickness, foreground color, font, font style, font size, alignment, line spacing, indent, maximum data length, validation, query, cursor type, pointer type, autosizing, position, and/or dimension, etc. A user interface can include one or more audio elements such as, for example, a volume control, pitch control, speed control, voice selector, and/or one or more elements for controlling audio play, speed, pause, fast forward, reverse, etc. A user interface can include one or more video elements such as, for example, elements controlling video play, speed, pause, fast forward, reverse, zoom-in, zoom-out, rotate, and/or tilt, etc. A user interface can include one or more animation elements such as, for example, elements controlling animation play, pause, fast forward, reverse, zoom-in, zoom-out, rotate, tilt, color, intensity, speed, frequency, appearance, etc. A user interface can include one or more haptic elements such as, for example, elements utilizing tactile stimulus, force, pressure, vibration, motion, displacement, temperature, etc.

variable-focus—having the quality of adjustable focus in a single specified optic.

vary—to change, alter, and/or modify one or more characteristics and/or attributes of.

via—by way of and/or utilizing.

voltage—(a.k.a., "potential difference" and "electro-motive force" (EMF)) a difference in electrical potential between any two conductors of an electrical circuit and/or a quantity, expressed as a signed number of Volts (V), and measured as a signed difference between two points in an electrical circuit which, when divided by the resistance in Ohms between those points, gives the current flowing between those points in Amperes, according to Ohm's Law.

wavefront—a surface containing points affected in substantially the same way by a wave at a substantially predetermined time.

wavelength—the distance between two adjacent peaks or crests of a wave.

weight—a value indicative of importance.

when—at a time and/or during the time at which.

wherein—in regard to which; and; and/or in addition to.

with—accompanied by.

zone—an area and/or region distinguished from adjacent parts by a distinctive feature and/or characteristic.

Note

Various substantially and specifically practical and useful exemplary embodiments are described herein, textually and/or graphically, including the best mode, if any, known to the inventor(s), for implementing the described subject matter by persons having ordinary skill in the art. Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects skilled artisans to implement such variations, details, and/or equivalents as appropriate, and the inventor(s) therefore intends for the described subject matter to be practiced other than as specifically described herein. Accordingly, as permitted by law, the described subject matter includes and covers all variations, details, and equivalents of that described subject matter. Moreover, as permitted by law, every combination of the herein described characteristics, functions, activities, substances, and/or structural elements, and all possible variations, details, and equivalents thereof, is encompassed by the described subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any described subject matter unless otherwise stated. No language herein should be construed as indicating any described subject matter as essential to the practice of the described subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential";

any two or more described substances can be mixed, combined, reacted, separated, and/or segregated;

any described characteristics, functions, activities, substances, and/or structural elements can be integrated, segregated, and/or duplicated;

any described activity can be performed manually, semi-automatically, and/or automatically;

any described activity can be repeated, any activity can be performed by multiple entities, and/or any activity can be performed in multiple jurisdictions; and any described characteristic, function, activity, substance, and/or structural element can be specifically excluded, the sequence of activities can vary, and/or the interrelationship of structural elements can vary.

The use of the terms "a", "an", "said", "the", and/or similar referents in the context of describing various embodiments (especially in the context of any claims presented herein or in any document claiming priority hereto) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate sub-range defined by such separate values is incorporated into and clearly implied as being presented within the specification as if it were individually recited herein. For example, if a range of 1 to 10 is described, even implicitly, unless otherwise stated, that range necessarily includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any phrase (i.e., one or more words) described herein or appearing in a claim is followed by a drawing element number, that drawing element number is exemplary and non-limiting on the description and claim scope.

No claim of this document or any document claiming priority hereto is intended to invoke paragraph six of 35 USC 112 unless the precise phrase "means for" is followed by a gerund.

Any information in any material (e.g., a United States patent, United States patent application, book, article, etc.) that has been incorporated by reference herein, is incorporated by reference herein in its entirety to its fullest enabling extent permitted by law yet only to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Within this document, and during prosecution of any patent application related hereto (including any patent application claiming priority hereto) any reference to any claimed subject matter is intended to reference the precise language of the then-pending claimed subject matter at that particular point in time only.

Accordingly, every portion (e.g., title, field, background, summary, description, abstract, drawing figure, etc.) of this document, and any provided definitions of the phrases used herein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document.

What is claimed is:

1. A system comprising:
   a diffractive first electro-active lens comprising a Fresnel structure comprising:
     a first zone defined by a first plurality of concentric rings, each ring from said first plurality of rings having a first radial cross-section height; and
     a second zone defined by a second plurality of concentric rings, each ring from said second plurality of rings having a second radial cross section height,
     wherein the first zone is closer to a center of the Fresnel structure than the second zone,
     wherein said first radial cross-section height is smaller than said second radial cross-section height.

2. The system of claim 1, wherein:
   said first radial cross-section height is substantially equal to a first integer multiple of predetermined wavelength of light.

3. The system of claim 1, wherein:
   said first radial cross-section height is substantially equal to a first integer multiple of a quotient corresponding to a predetermined wavelength of light divided into a difference in refractive index, the difference in refractive index being between the diffractive first electro-active lens and an electro-active material in optical communication with the Fresnel structure; and
   said second radial cross-section height is substantially equal to a second integer multiple of said quotient.

4. The system of claim 1, wherein:
   said first radial cross-section height is substantially equal to a first integer multiple of a quotient corresponding to a predetermined wavelength of light divided into a difference of a first refractive index of the diffractive first electro-active lens that corresponds to when said lens is electrically powered and a second refractive index of said lens that corresponds to when said lens is not electrically powered, and
   said second radial cross-section height is substantially equal to a second integer multiple of said quotient.

5. The system of claim 1, wherein:
   said Fresnel structure is formed in a first substrate.

6. The system of claim 1, wherein:
   said Fresnel structure is optically coupled to a liquid crystal.

7. The system of claim 1, wherein:
   said Fresnel structure is formed in a first substrate that is flooded with a liquid crystal.

8. The system of claim 1, wherein:
   said Fresnel structure is formed in a first substrate that, in cooperation with a second substrate, sandwiches a liquid crystal.

9. The system of claim 1, wherein:
   said first zone is located adjacent to said second zone.

10. The system of claim 1, wherein:
    said first electro-active lens is an ophthalmic lens.

11. The system of claim 1, wherein:
    said system is a camera.

12. The system of claim 1, wherein:
    said system is a projector.

13. The system of claim 1, wherein:
    said system is a solar concentrator.

14. The system of claim 1, wherein:
    said system comprises a second electro-active lens.

15. The system of claim 1, wherein:
    said system comprises a refractive electro-active lens.

16. The system of claim 1, wherein:
    said system comprises a fluidic lens.

17. The system of claim 1, wherein:
    said system comprises a conventional refractive lens.

18. The system of claim 1, wherein:
    at least one of said first plurality of concentric rings has a rounded outer corner.

19. The system of claim 1, wherein:
    at least one of said first plurality of concentric rings has a rounded inner corner.

20. A method comprising:
    in a system comprising:
      a diffractive first electro-active lens comprising a Fresnel structure comprising:
      a first zone defined by a first plurality of concentric rings, each ring from said first plurality of rings having a first radial cross-section height substantially equal to a first integer multiple of a predetermined wavelength of light; and
      a second zone defined by a second plurality of concentric rings, each ring from said second plurality of rings having a second radial cross-section height substantially equal to a second integer multiple of the predetermined wavelength of light;
      said first integer multiple differing from said second integer multiple;
    switching said diffractive first electro-active lens from a first power state corresponding to a first optical power to a second power state corresponding to a second optical power that differs from said first optical power.

21. An electro-active lens system having a variable optical power, the electro-active lens system comprising:
- an electro-active material having a variable refractive index to change the variable optical power of the electro-active lens system; and
- a substrate, in optical communication with the electro-active material, having a refractive index, the substrate defining a diffractive structure comprising:
  - a first plurality of rings, each ring in the first plurality of rings having a first height approximately equal to a first integer multiple of a ratio of a predetermined wavelength of light to a difference in refractive index, the difference in refractive index being between the substrate and the electro-active material when it is electrically powered;
  - a plurality of rings, concentric to the first ring, each ring in the second plurality of rings having a second height approximately equal to a second integer multiple of the ratio.

22. The electro-active lens system of claim 21, wherein the first plurality of rings defines a first peak in a first plane and the second plurality of rings defines a second peak in the first plane.

* * * * *